April 15, 1969     F. R. ALBRIS     3,438,417
CANTING LOCK BOLT
Filed Jan. 20, 1967
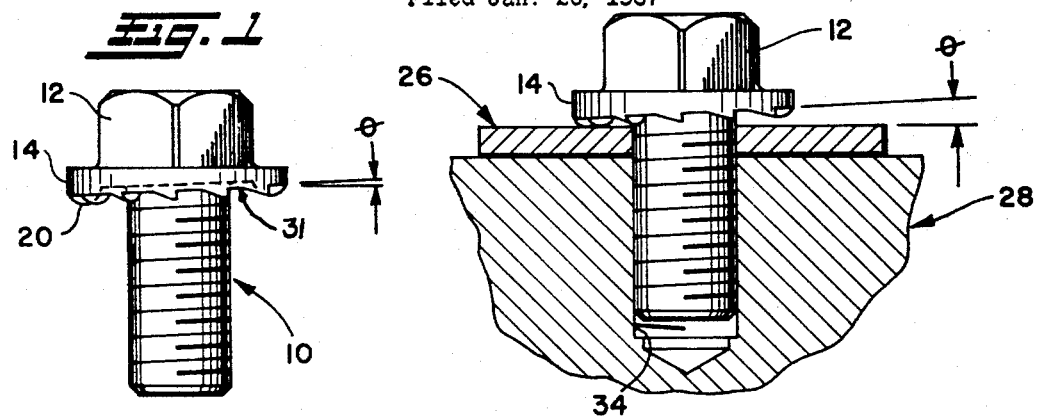
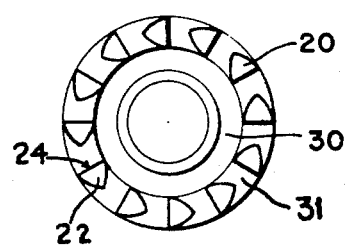
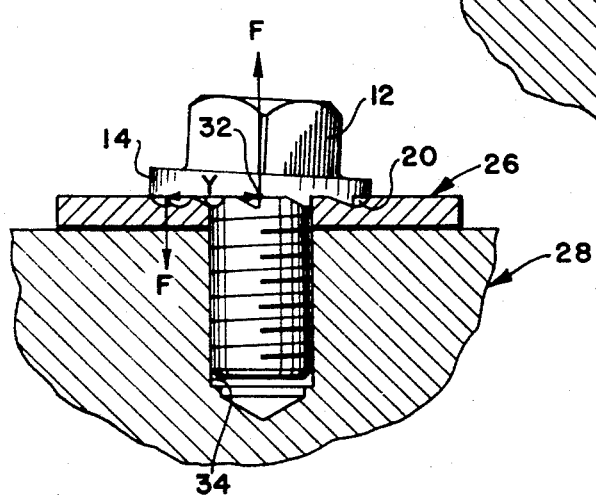
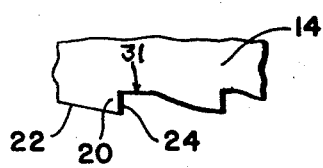
INVENTOR.
FRANK R. ALBRIS
BY
ATTORNEYS 3,438,417
CANTING LOCK BOLT
Frank R. Albris, Massillon, Ohio, assignor to Eaton Yale
& Towne Inc., Cleveland, Ohio, a corporation of Ohio
Filed Jan. 20, 1967, Ser. No. 610,658
Int. Cl. F16b 39/282, 39/284
U.S. Cl. 151—37                                         4 Claims

ABSTRACT OF THE DISCLOSURE

A self-locking threaded fastener having the undersurface of the head inclined with respect to a plane normal to the rotational axis of the fastener with locking being assisted by toothed projections extending from the undersurface of the head in the direction of the axis of rotation of the fastener.

---

This invention relates generally to a lock bolt construction and more particularly to a self-locking bolt which may be readily made with standard machines and handled by conventional tools where the lock bolt is particularly characterized by the combination of a bearing surface on the underside of the head which is inclined with respect to the axis of rotation of the bolt and a series of projections extending from the bearing surface in an axial direction.

It is an object of this invention to provide an improved lock bolt structure.

It is another object of this invention to provide an improved lock bolt which relies for effectiveness only upon the properties of the bolt and upon the properties of no other part or piece.

It is a further object of this invention to provide an improved lock bolt of a type utilizing an unresolved moment to obtain improved locking.

It is still another object of this invention to provide an improved lock bolt wherein an unresolved moment in the bolt is combined with a projection on the bearing surface of the bolt head to provide a mechanical locking feature when the bolt is drawn against an abutment.

Many other objects, features, and advantages will become readily apparent to those persons versed in the art by reference to the following detailed description and accompanying sheet of drawing in which the preferred structural embodiment of the invention is shown.

On the drawing:

FIGURE 1 is a side elevational view of the lock bolt provided with the features of the present invention.

FIGURE 2 is a bottom plan view of the lock bolt in FIGURE 1.

FIGURE 3 is a lock bolt of FIGURE 1 in a mating workpiece.

FIGURE 4 is similar to FIGURE 3 where the lock bolt has been drawn against the workpiece.

FIGURE 5 is generally similar to FIGURE 4 illustrating in greater detail the locking feature of the lock bolt.

FIGURE 6 is a detail of the projections on the flange.

As shown on the drawing:

In FIGURE 1 there is shown a lock bolt 10 which may be of any desired size or shape, with any desired thread and with any desired head type.

In accordance with the principles of the invention, the lock bolt 10 is provided with a head 12 and radially extending flange member 14 integral with the head 12. The outer periphery of the lower surface of the flange member 14 is provided with a series of toothed projections 20 extending downward in the direction of the axis of rotation of the lock bolt 10. These projections 20 are shown in detail in FIGURE 6 and are themselves comprised of a wedge surface 22 and an axial surface 24. The projections 20 are located on the peripheral edge of the lower surface of flange 14 in a manner that the wedge surface 22 leads the axial surface 24 when the lock bolt 10 is being rotated in an engaging direction. When the lock bolt is drawn tightly into engagement with a workpiece, as shown in FIGURE 4, the projections 20 are drawn into the surface of the workpiece 26 such that the axial surface 24 is mechanically held against rotation of the lock bolt 10 in a direction tending to disengage the lock bolt 10 from the tapped piece 28. The use of wedged projections for the purpose of locking a bolt to a workpiece is known in the art and is shown in U.S. Patent 2,959,204 wherein an excellent discussion is had on the beneficial effects of wedged projections on the bearing surfaces of bolts and nuts for locking purposes. Although contributing significantly to the effectiveness of the lock bolt 10, the wedged projections 20 are only one feature of this invention.

Another feature of this invention is that the bearing surface 31 of the flange 14 from which the projections 20 extend is inclined with respect to a plane normal to the axis of rotation of the lock bolt 10. The underside of the flange 14 is also provided with a circular recessed portion 30 of uniform depth with respect to the inclined bearing surface 31. This recessed portion 30 provides a relief for metal displaced on the workpiece 26 by tightening engagement of the projections 20. The angle of inclination designated as $\theta$ in the drawing is always small and always less than the angle of the thread helix. It is important however, that the angle $\theta$ be greater than the maximum manufacturing error, therefore, angle $\theta$ should be at least 2° to insure a beneficial canting of the bolt. When the lock bolt 10 is drawn down against a workpiece 26 as is shown in FIGURE 4, the lower bearing surface 31 of the flange 14 is drawn against the workpiece 26 such that all of the projections 20 are engaged in the workpiece 26 to the same extent and the lock bolt 10 is angularly deformed from a point 32 on the rotational axis of the lock bolt and horizontally aligned with the upper surface of the workpiece 26. This deformation of the lock bolt 10 is elastic and there exists within the lock bolt 10 an unresolved moment as illustrated in FIGURE 5. This moment consists of the force F necessary to deform the flange 14 from the angle $\theta$ to conform with the surface of workpiece 26 multiplied by a moment arm Y which is the radius of the projections 20 from the rotational axis of the lock bolt 10. The moment F.Y assists in firmly locking the lock bolt 10 in place and preventing a loosening rotation in two ways:

First, the force F which acts along the axis of rotation of the lock bolt creates tension in the lock bolt 10 and forces the bolt threads upwardly into firm engagement with the mating threads 34 of the piece 28 thereby creating a high thread engagement force which assists in creating a good friction locking condition.

Secondly, the force F acting at the periphery of the flange 14 through certain of the projections 20 to hold those projections in engagement with the workpiece 26.

It is of course understood that the beneficial effects of this unresolved moment F.Y are in addition to the effects of tension in the lock bolt 10 caused by drawing the bolt into engagement with workpiece 26 as shown in FIGURE 4 which would exist if the flange 14 were not inclined.

Having thus described my invention, it will become immediately obvious to those skilled in the art that I have discovered a new and improved lock bolt for which a large number of applications exist, particularly in areas where the lock bolt when installed will be subjected to vibrations whose tendency is to loosen bolts with more conventional locking means. The effectiveness of my im- provement in preventing loosening due to vibration can graphically be illustrated by means of selected test results comparing the locking effectiveness of more conventional locking means with the effectiveness of my improved lock bolt.

With all screws clamped at 1,800# in a Sonntag Fatigue Machine:

| Screw type: | Vibration cycles to loosen |
|---|---|
| Cap screw no locking device | 2,000 |
| Cap screw split ring lockwasher | 31,000 |
| Invented lock screw | 504,000 |

It can be seen that my invention is substantially more resistant to vibratory loosening than conventional fasteners and locking devices.

Having thus described my invention, what is claimed is:

1. A self-locking threaded bolt for use with a piece having mating threads comprising:
   an upper portion having tool engageable configuration;
   an intermediate portion adjacent to and integral with the upper portion extending generally radially from the axis of rotation of the bolt and having a bearing surface facing generally away from the upper portion, said bearing surface being inclined with respect to a plane normal to the axis of rotation of the bolt;
   a series of projections extending axially from the outer periphery of the bearing surface for engagement with a workpiece when the bolt is drawn into tight engagement with the piece having mating threads; and
   a lower helically threaded cylindrical portion having a diameter lesser than the diameter of the intermediate portion,
   integral with the intermediate portion and extending along the rotational axis of the bolt away from the intermediate portion.

2. The bolt of claim 1 wherein:
   the angle of inclination of the bearing surface with respect to a plane normal to the axis of rotation of the bolt is less than the helix angle of the bolt thread.

3. The bolt of claim 1 wherein:
   the angle of inclination of the bearing surface with respect to a plane normal to the axis of rotation of the bolt is at least 2°.

4. The bolt of claim 1 wherein:
   the projections comprise:
   a protrusion in the axial direction having one lateral surface in the direction of tightening rotation of the bolt being an inclined plane and one lateral surface away from the direction of tightening rotation being an axial planar surface,
   whereby this protrusion will allow tightening of the bearing surface against a workpiece, but will prevent rotation of the bolt in a loosening direction without the application of a substantial torque.

References Cited

UNITED STATES PATENTS

| | | | |
|---|---|---|---|
| 240,387 | 4/1881 | Cowdy | 151—37 |
| 1,387,085 | 7/1921 | Whippey | 151—20 |
| 2,253,241 | 8/1941 | MacDonald | 151—37 |
| 2,562,032 | 7/1951 | Gutensohn | 151—20 |
| 2,959,204 | 11/1960 | Rigot | 151—37 |
| 3,087,525 | 4/1963 | Nyswaner et al. | 151—37 |

EDWARD C. ALLEN, *Primary Examiner.*

U.S. Cl. X.R.

151—20